United States Patent [19]

Mirville et al.

[11] Patent Number: 5,745,553
[45] Date of Patent: Apr. 28, 1998

[54] ON-DEMAND COMMUNICATIONS SERVICES

[75] Inventors: Jean-Robert Mirville, Manalapan; David Phillip Silverman, Somerville, both of N.J.

[73] Assignee: AT&T Corp., Middletown, N.J.

[21] Appl. No.: 632,864

[22] Filed: Apr. 16, 1996

[51] Int. Cl.⁶ .................. H04M 1/64; H04M 3/42
[52] U.S. Cl. ................ 379/67; 379/201; 379/204; 379/211
[58] Field of Search ............... 379/201, 112, 379/114, 67, 88, 204, 142, 127, 211, 215; 370/271, 259

[56] References Cited

U.S. PATENT DOCUMENTS

| | | | |
|---|---|---|---|
| 4,710,917 | 12/1987 | Tompkins et al. | 370/271 X |
| 4,935,956 | 6/1990 | Hellwarth et al. | 379/112 |
| 5,003,584 | 3/1991 | Benyacar et al. | 379/114 |
| 5,146,491 | 9/1992 | Silver et al. | 379/114 |
| 5,199,062 | 3/1993 | Von Meister et al. | 379/67 |
| 5,394,463 | 2/1995 | Fischell et al. | 379/201 |
| 5,414,754 | 5/1995 | Pugh et al. | 379/67 |
| 5,425,097 | 6/1995 | Pula | 379/396 |
| 5,440,624 | 8/1995 | Schoof, II | 379/202 |
| 5,477,546 | 12/1995 | Shibata et al. | 370/260 |
| 5,487,111 | 1/1996 | Slusky | 379/211 |
| 5,524,146 | 6/1996 | Morrisey et al. | 379/207 |
| 5,533,110 | 7/1996 | Pinard et al. | 379/201 |
| 5,544,236 | 8/1996 | Andruska et al. | 379/201 |
| 5,568,541 | 10/1996 | Greene | 379/114 |
| 5,602,907 | 2/1997 | Hata et al. | 379/114 |
| 5,615,257 | 3/1997 | Pezzullo et al. | 379/396 |

OTHER PUBLICATIONS

AT&T Technical Journal, Jul./Aug. 1985, vol. 64, Issue 6, pp. 1305-1564, entitled "5ESS Switching System" by K. E. Martersteck, et al. Please note the Introduction portion of this journal is attached hereto. If the Examiner so requests, the complete Journal will be supplied.

AT&T Technical Journal, vol. 65, Issue 5, pp. 34–47, Sep. Oct.1986, "Conversant 1 Voice system: Architecture and Applications" by Robert J, Perdue, et al.

Bellcore Technical Reference TR–NWT–001273, Issue 1, Dec. 1992, "Generic Requirements for an SPCS to Customer Premises Equipment data Interface for Analog Display Services", Please note the Technical Reference Bulletins 1,2 and 3 are attached together with the table of contents for said reference. If the Examiner so requests, the complete reference will be supplied.

Primary Examiner—Thomas W. Brown

[57] ABSTRACT

A communications system is designed to transmit to end-user devices involved in a call information related to communications services that are invokable in real time from the end-user devices. The transmitted information includes activation codes for invoking for a usage fee, features that may or may not be subscribed to by a caller.

21 Claims, 8 Drawing Sheets

FIG. 3

| TELEPHONE NUMBER | FACILITIES | CALLER ID | CALL FORWARDING | 3-WAY CALLING | ... | CALL WAITING | LANGUAGE PREFERENCE |
|---|---|---|---|---|---|---|---|
| 908-555-1234 | POTS | Y | Y | N | ... | Y | — |
| 201-555-2468 | ISDN | Y | N | Y | ... | N | — |
| 212-555-1776 | POTS | Y | Y | N | ... | Y | SPANISH |
| ... | ... | ... | ... | ... | ... | ... | ... |
| 215-318-9988 | DIGITAL CATV | Y | N | Y | ... | N | FRENCH |

FIG. 4

| FEATURE | ACTIVATION CODE | SERVICE FEE |
|---|---|---|
| SPEED DIALING | *1 | 10¢ |
| AUTOMATIC CALLBACK | *2 | 30¢ |
| VOICE MAIL | *3 | 40¢ |
| LEAVE WORD CALLING | *4 | 45¢ |
| 3-WAY CALLING | *5 | 50¢ |
| CALL FORWARDING | *6 | 60¢ |
| CALL TRACING | *7 | 70¢ |
| CALL MUTING | *8 | 75¢ |
| CALL WAITING | *9 | 80¢ |
| 3-WAY CALLING | *10 | 50¢ |
| RETURN A CALL | *11 | 10¢ |
| OPERATOR ASSISTANCE | *12 | 10¢ |
| X FEATURE | *N | Y¢ |
| POINTER 2 | — | — |
| ⋮ | — | — |
| POINTER N | — | — |

401 — 402 — 403

ON-DEMAND COMMUNICATIONS SERVICES

TECHNICAL FIELD

This disclosure relates to communications systems and, more particularly, to a method and for providing communications services users with information related to services features.

BACKGROUND

Advances in communications technology, such as switching systems that can support Local Area Signaling Services (LASS) capabilities, Information Services Digital Network (ISDN) protocols and Asynchronous Transfer Mode (ATM) standards, have allowed communications carriers to offer a rich set of communications services features to their subscribers. These features include call waiting, call forwarding, three-way calling, automatic callback and repeat dialing, to name a few. Typically, these features are available to users on a monthly subscription basis except for a limited number of features that are accessible to non-subscribers on a call-by-call basis for a usage fee.

Communications carriers have been reluctant to make a wider variety of features available to users on a call-by-call basis for a variety of reasons. Prominent among those reasons is the considerable amount of financial resources that must be devoted to advertise the functionality of each feature and to familiarize casual users with activation codes to invoke these features. Equally significant is a concern that if infrequent users were to remember how to activate a great number of features, these users may invoke the wrong features at inopportune times resulting in a chilling effect on further use of those features. Hence, a problem of the prior art is a lack of a cost-effective communications channel via which subscribers can be timely informed of services features available from their communications carriers. Another problem of the prior art is a lack of mechanism to inform users on how to activate (in a real-time fashion) communications services features that are available on a call-by-call basis.

Even more problematic is the fact that a significant number of communications features provided by premises switching systems, such as Private Branch Exchanges (PBX), are seldom used even though potential users do not have to pay a monthly usage fee or a service fee for each instance of use. In order to overcome the problem associated with users' lack of knowledge regarding features functionality, and/or activation mechanisms to invoke features, PBX equipment manufacturers have developed end-user terminals with feature buttons to activate services such as call forwarding, auto callback, three-way calling, redialing, to name a few. However, those telephone sets are rather expensive and, as such, are typically provided to a few privileged users. In addition, there is a limited number of feature buttons that can physically fit on those telephone sets.

The problem that can be characterized as—too many unused features by too many uninformed users—is expected to be exacerbated in the future because of the anticipated wide scale deployment of premises-based and network-based multimedia communications systems which add another layer of visual, interactive and expressive features to the already rich set of communications features. Hence, a general problem of the prior art is lack of a mechanism to provide end-users of electronic equipment in general, and communications end-user devices in particular, with information associated with features of those devices when those features are most needed.

SUMMARY

Disclosed herein are a system and a method that allow information related to communications services features that are invokable in real time to be transmitted to one or more end-user devices involved in a conventional or multimedia call before, during and/or after the call is completed or answered.

In an embodiment of the principles disclosed herein, a processor that is coupled to a switching system processing a call, creates one or more data records that are forwarded to the switching system for delivery to one or more end-user devices involved in the call. Each field in the record includes an activation code that is associated with a communications service feature that is invokable for a fee. Alternatively, a record may include a hypertext or a bit-mapped image of activation mechanism(s) for one or more selected services features. Hypertext or bit-mapped image records are delivered by the switching system typically to multimedia terminals for invocation in connection with a communications session or a call.

When a call is initiated from, or destined for, a Plain Old Telephone Service (POTS) device, the switching system uses the Analog Display Services Interface (ADSI) protocol to deliver the data record to the POTS end-user device. For an ISDN-compatible end-user device, the switching system delivers the data record thereto via the data channel of the Basic Rate Interface (BRI). Alternatively, the switch may deliver the data record via a data channel of a Community Antenna Television (CATV) cable distribution system when the end-user device is coupled to such a distribution system. The switching system may be a communications carrier's network that is comprised of an access switch and an egress switch connected to the calling party and called party end-user devices, respectively. Alternatively, the switching system may be a single switch of a carrier's network or a PBX connected to one or more of the end-user devices involved in the call. Optionally, the switching system may be a computer network that is comprised of interconnected processing nodes arranged to switch digital signals according to a common addressing protocol.

According to another aspect of the system disclosed herein, different types of records associated with various combinations of communications services features may be delivered to end-user devices involved in a call at different stages of that call. For example, during call setup time, a record that includes information associated with features such as voice mail, leave-word calling, automatic ring back may be delivered to the calling party. These features are thus readily invokable by the calling party when the called party is unavailable due to a ring-no-answer or busy line condition. During the ringing stage of the call, information associated with features such as call forwarding, call muting or call tracing may be displayed to the called party. When the switching system receives a second call that is destined for one of the parties in a first call, the switching system may deliver to the party in question information associated with features such as call waiting, and three-way calling.

BRIEF DESCRIPTION OF THE DRAWINGS

FIG. 3 depicts a table that maps pre-subscribed features to telephone numbers or addresses of communications services users;

FIG. 4 shows the contents of different fields that may be strung together to form a record that is delivered to a communications services user;

DETAILED DESCRIPTION

Figure 1:
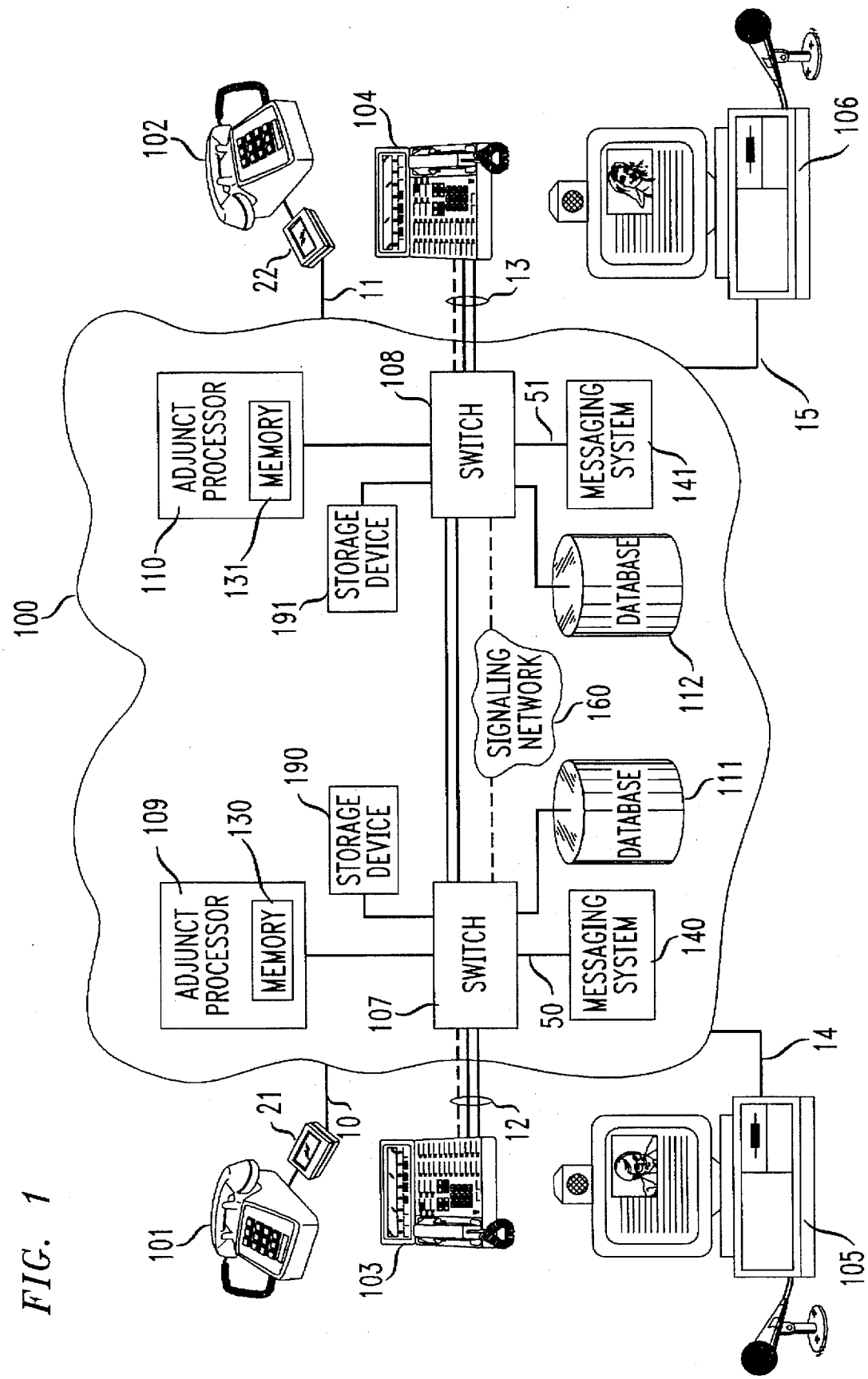
FIGS. 1 and 2 show in block diagram format communications switching systems arranged to deliver services features information to communications services users.

FIG. 1 shows in block diagram format a communications switching system 100 which includes similarly configured access/egress switches 107 and 108 that are connected respectively to functionally analogous adjunct processors 109 and 110 and equivalent databases 111 and 112. Because of the similarities of some of the components of FIG. 1, a description of the functionality of these components is provided below with reference to equivalent components indicated in parentheses for the sake of simplicity. Switch 107 (108) is a processor-controlled, software-driven communications system that is arranged to route calls to destination numbers that are provided by a user or received from another switch. A well-known communications switch is the AT&T 5ESS® switch whose features and functionality are described in AT&T Technical Journal, Vol. 64, No. 6, part 2, pp. 1305–1564, July/August, 1985. Switch 107 (108) communicates with analog end-user devices, such as telephone set 101 (102), via physical interfaces which include analog ports and POTS facilities, such as line 10 (11). Other physical interfaces of switch 107 (108) include digital ports via which the switch transmits signals to digital facility 12 (13) for communications to ISDN telephone set 103 (104). Digital facility line 12 (13) is a Basic Rate Interface (BRI) loop which has two bearer (B) channels and one data (D) channel that carries signaling information for the bearer channels. When switch 107 (108) serves a CATV cable distribution system, multimedia terminals such as set 105 (106) may be connected to the switch via coaxial cable 14 (15) that serves as a conduit for multiplexed data voice and video signals via one or more logical channels.

Switch 107 (108) is provisioned to support all the Business and Residence Custom Services (BRCS) features that may be offered on a subscription or call-by-call basis to end-user devices connected to the switch. A partial list of these features is shown in the rightmost column of FIG. 4. One of these features (not shown in FIG. 4) is the caller identification service that is also referred to as "caller-id" for short. Caller identification service allows an end-user device to receive the telephone number associated with an incoming call destined for that end-user device. When an incoming call is destined for analog telephone set 101 (102), switch 107 (108) delivers the originating telephone number associated with the call—also called "caller-id information"—between the first ring and the second ring. That information appears on a screen of display unit 21 (22), which is arranged to record and display caller-id numbers of incoming calls. Of particular significance among the features of display unit 21 (22) is its ADSI-compatibility characteristic which allows display unit 21 (22) to receive signaling information even when telephone set 101 (102) is off-hook. As is well known in the art, the ADSI standards allow a central office switch, such as switch 107 (108) to send limited information, such as signaling information, to an analog telephone set regardless of whether the telephone set in on-hook or off-hook. Further information on the ADSI standards can be found in *"Generic Requirements for an SPCS to Customer Premises Equipment Data Interface for Analog Display Services"* BellCore Technical Reference (TR-NWT-001273), Issue 1, December 1992.

Switch 107 (108) is also arranged to forward caller-id and other signaling information to digital telephone set 103 (104) via the D channel (indicated by the broken line) of ISDN loop 12 (13). The forwarded signaling information received by ISDN telephone set 103 (104) is displayed on the screen of that set. Similarly, when switch 107 (108) serves a CATV cable distribution system, caller-id and other signaling information may be forwarded to multimedia terminal 105 (106) via a logical data channel of facility 14 (15).

Figure 2:
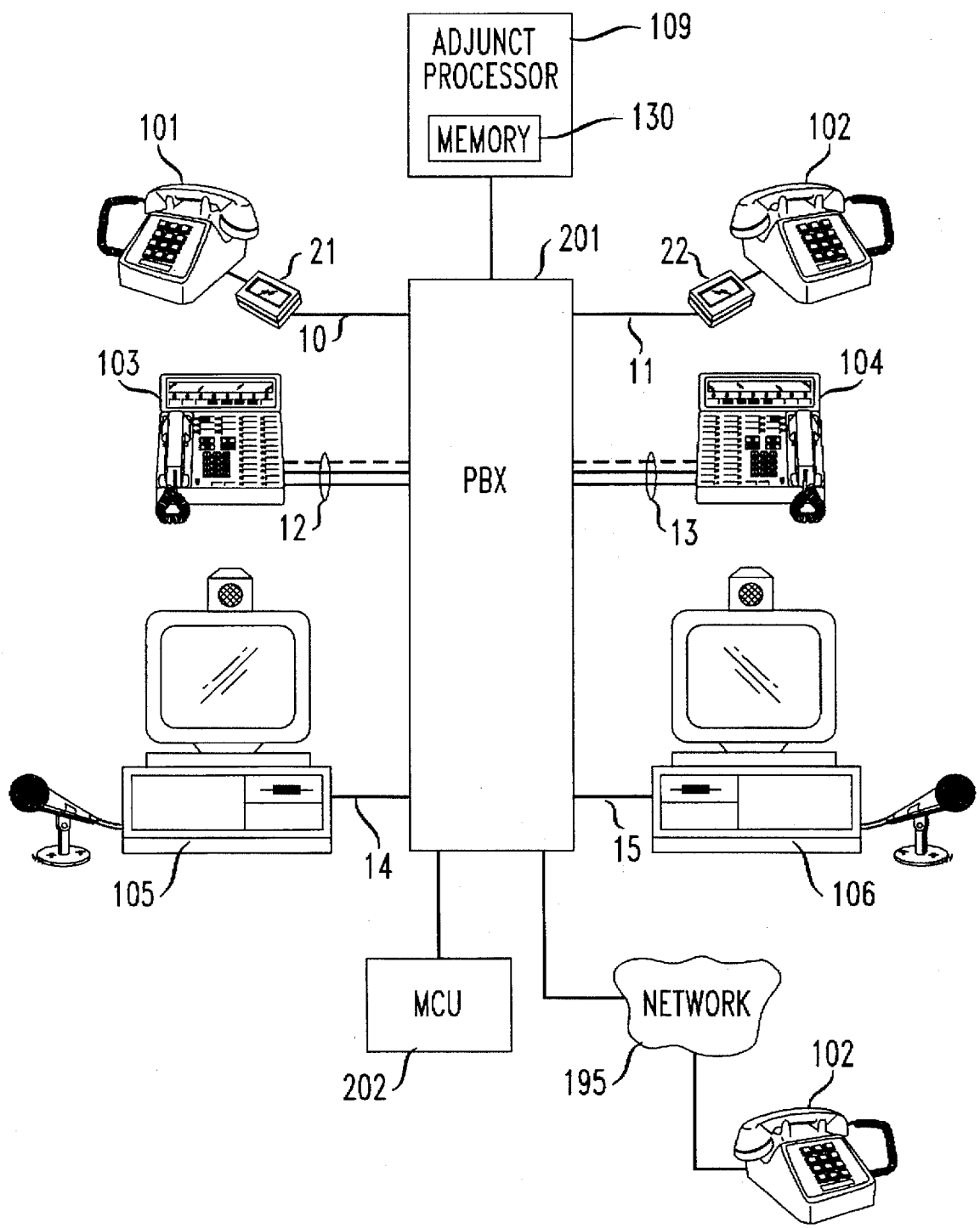
Figure 5:
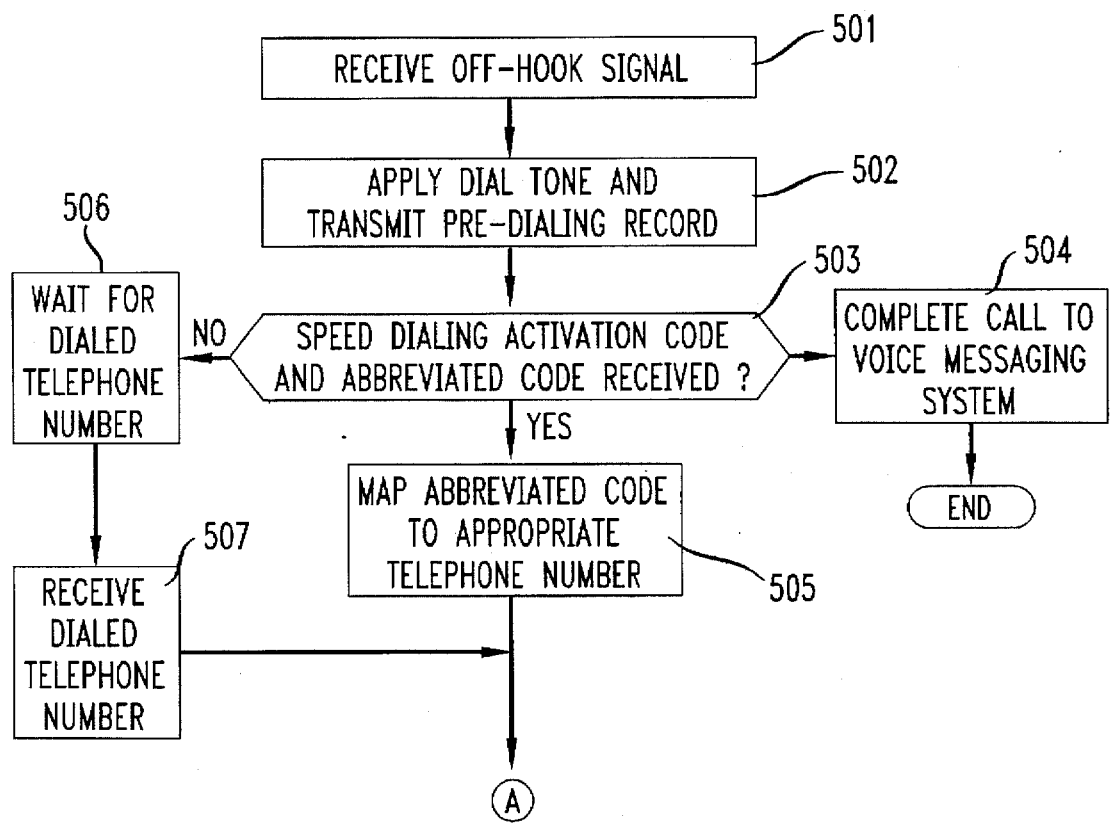
FIGS. 5, 6 and 7 are illustrative programmed instructions executed by different components of FIG. 1 to generate and transmit communications services feature information to a user.
Figure 6:
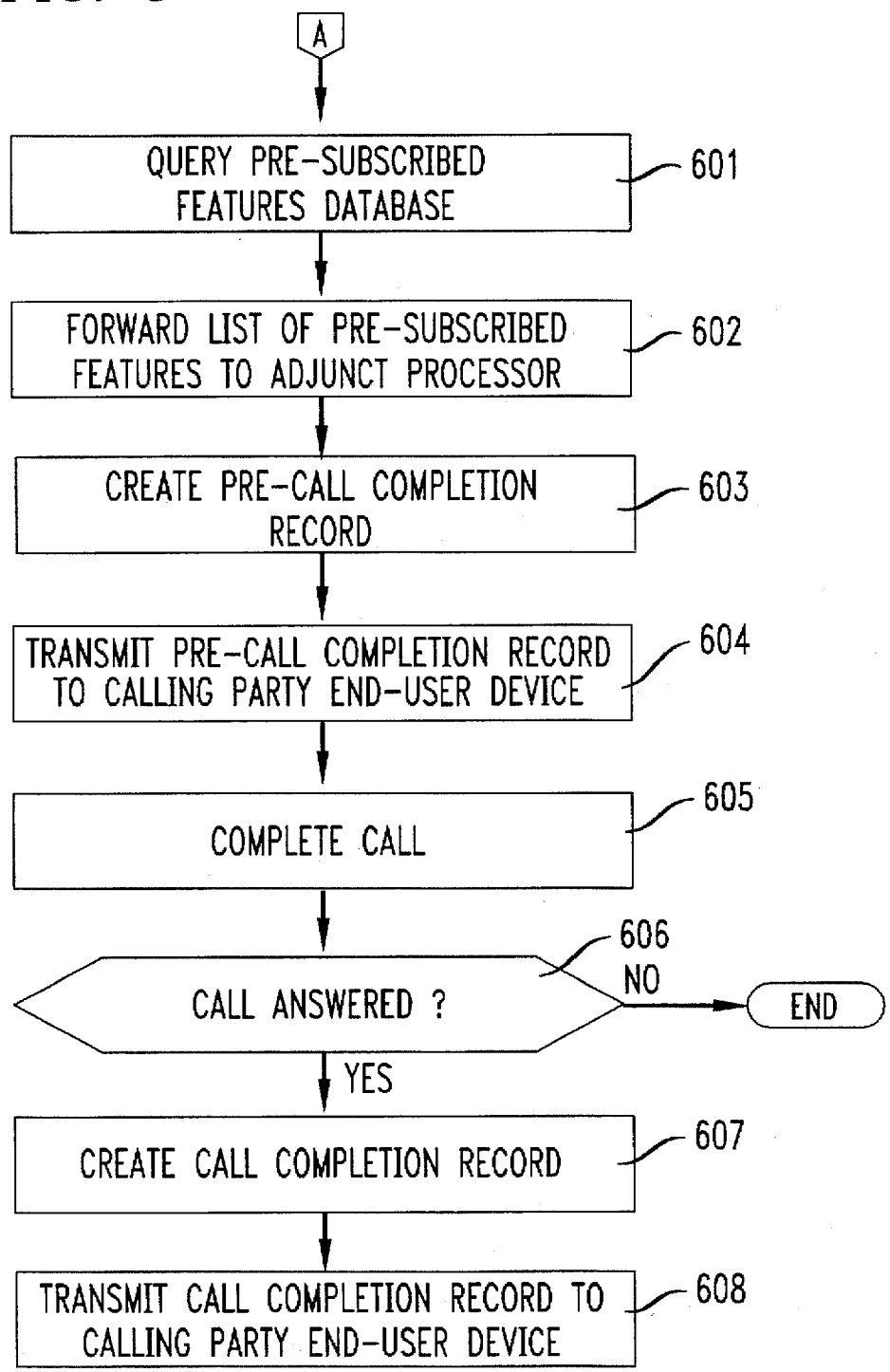

Alternatively, communications switching system 100 of FIG. 1 may be replaced with PBX 201 of FIG. 2 which illustrates a communications switching system arranged to implement a premises version of the principles of the system disclosed herein. PBX 201 is a premises switching system, such as the AT&T Definity® System that is arranged to deliver communications services feature information to end-user terminals. When PBX 201 is provisioned to support switched digital data services, multimedia communications may be provided to suitable end points, such as multimedia terminals 105 and 106 via Multimedia Conferencing Unit (MCU) 202 that is connected to PBX 201. Optionally, communications switching system 100 of FIG. 1 may be replaced with a computer network (not shown) that is comprised of interconnected processing nodes arranged to switch digital signals according to a common addressing protocol.

Also connected to central office switch 107 (108) of FIG. 1 is adjunct processor 109 (110) which is a general purpose computer that executes instructions included in a software program stored in memory 130 (131). The instructions of the software program are designed to create a record to be displayed to a subscriber based on input received from switch 107 (108). Specifically when switch 107 (108) receives a request from a calling party to complete a call to a called party, switch 107 (108) queries database 111 (112) to determine the types of features subscribed by one or both of the parties. Database 111 (112) is a repository of subscriber information which includes a table that correlates a subscriber's telephone number to features subscribed by the subscriber and the type of facility serving the subscriber. An illustrative representation of such a table is shown in FIG. 3 in which facilities serving subscribers are labeled POTS (for analog facilities), ISDN (for BRI facilities) and Digital CATV (for cable distribution system). A non-exhaustive list of features is also shown in FIG. 3 with "Y" and "N" entries indicating features pre-subscribed and non-subscribed, respectively, by a party. Optionally the table of FIG. 3 may include a language preference field which allows the subscriber to receive information in a preferred or selected language. Once switch 107 (108) retrieves a record for a subscriber, the retrieved record is forwarded to adjunct processor 109 (110) which uses that information to create the record (in a particular language) to be transmitted to the subscriber. Different types of records are created by adjunct processor (109) 110 at different stages of a call, as explained below.

In order to create a record, adjunct processor fetches memory 130 (131) to retrieve a messaging table from which adjunct processor 109 (110) extracts appropriate fields to be included in the record. An exemplary representation of one such table is shown in FIG. 4 which illustrates a list of features with associated activation codes and the service fee for invoking each feature. Each row in the table of FIG. 4 includes 3 fields, namely, a first field 401 which identifies a particular feature, an activation field 402 that contains instructions on how to invoke the feature, and a service fee field 403 which indicates the charge to be paid for invoking the feature. For multimedia applications, the table of FIG. 4 also includes one or more pointers that direct adjunct processor 109 (110) to retrieve one or more graphic files for display to a multimedia terminal. The graphic file may include information associated with features such as picture substitution and picture muting. As is well known in the art of multimedia communications, picture substitution allows a party in a call to send a different picture than his own image during the call. The picture muting feature allows one of the parties in a call to prevent any image to be transmitted to another party.

The type of facility serving the subscriber is used by the adjunct processor to determine how to include information extracted from FIG. 4 into a record to be displayed to a subscriber. For example, a record that is created for display to an analog end-user device, such as display unit 21 (22) may include abbreviated words because of the limited bandwidth available for ADSI data on POTS lines. By contrast, records created for display to ISDN-compatible end-user devices may be more detailed while multimedia terminals may receive records in pictorial animated format with detailed instructions on the functionality of these features and how to activate them.

In an illustrative embodiment of the principles disclosed herein, adjunct processor 109 (110) may include the fields in a record such that the fields are displayed in a particular order. For example, fields associated with pre-subscribed features may be displayed first. Fields associated with non-subscribed features may be displayed in decreasing order of general commercial acceptance. For pre-subscribed features, the service fee field is typically not included in the record.

Also shown in FIG. 1 is voice messaging system 140 (141) that is connected to switch 107 (108) via trunks 50 (51). Voice messaging system 140 (141) includes a call processing unit which executes a set of scripts to answer an incoming call and to greet a caller with a pre-recorded voice announcement that invites the caller to leave a message for a called party. A voice messaging system may be implemented using the AT&T Conversant® Voice System whose architecture and features are described in *AT&T Technical Journal* Vol. 65, Issue 5, pp. 34–47, September/October 1986. When switch 107 (108) completes a call to a called party, switch 107 (108) listens to terminating supervisory signals or call progress tones (busy, ring-no-answer) in order to take specific actions based on the type of signal received. For example, when switch 107 (108) receives a signal from a caller indicating that the caller would like to leave a message for a called party, switch 107 (108) transfers the call to voice messaging system 140 (141) which delivers an announcement to the caller inviting him or her to leave a message for the called party. The announcement would indicate to the caller, for example, that the carrier would attempt to contact the called party at periodic intervals to deliver the recorded message.

According to an aspect of the principles disclosed herein, voice messaging system 140 (141) is also arranged to deliver to callers pre-recorded announcements that explain the functionality provided by a particular feature. When a user dials a toll-free number associated with voice messaging system 140 (141), the caller is invited to enter the mnemonic associated with the feature of interest. For example, when a user enters * 1 on a dial pad, the user will hear a pre-recorded announcement associated with the feature that is typically displayed with *1 as the activation code for invoking that feature. Alternatively a live operator may also explain the functionality provided by one or more features.

Communications switches 107 and 108 exchange call processing messages via a signaling network 160 which is comprised of a plurality of interconnected packet switching nodes that route the call processing messages to their appropriate destinations according to a defined protocol, such as the well-known Common Channel Signaling (CCS) protocol. Communications switch 107 (108) also includes a storage device 190 (191) which contains information associated with a particular line. For example, subscribers may wish to keep on storage device 190 (191) abbreviated codes or spoken mnemonics associated with frequently called numbers such that when the speed dialing feature is invokable by a caller, switch 107 (108) can map an abbreviated code or a spoken word to a desired telephone number. Communications switch 107 (108) also includes a buffer (not shown) which stores predialing records for display to subscribers.

It is worth noting that although the communications system 100 of FIG. 1 does not show any toll switches or Inter-exchange carrier, it is to be understood that one or more toll switches may be included in communications system 100.

Figure 8:
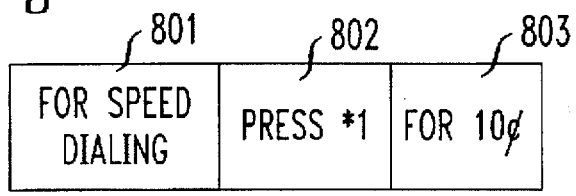
FIGS. 8, 9, 10 and 11 are illustrative data records generated by the processor of FIG. 1 for delivery to a communications services user.

The feature information service of the principles disclosed herein is initiated in step 501 when switch 107 (108) receives an-off-hook signal indicative of a caller's desire to place a phone call. Switch 107 (108) in step 502, applies a dial tone to the caller's telephone set, and transmits thereto the pre-dialing record illustrated in FIG. 8. The pre-dialing record of FIG. 8 shows field 802 that contains an illustrative activation code * 1 that may be entered by a caller to invoke the speed dialing feature that is shown in field 801, at an illustrative cost of 10 cents indicated in field 803. If the caller enters * 1 and there is no abbreviated code stored on storage device 190 (191) for the line, as determined in step 503, switch 107 (108) then, in step 504, completes the call to voice messaging system 140 (141) which provides the caller with information associated with the speed dialing feature and how to store frequently dialed numbers. If the abbreviated code entered by the caller is present in storage device 190 (191), switch 107 (108), in step 505 maps the abbreviated code to the appropriate telephone number hereinafter referred to as "called party number". When the caller does not invoke the speed dialing feature as determined in step 503, switch 107 (108), in step 506 waits for a dialed number until that number (hereinafter referred to as "called party number") is received in step 507. For the sake of clarity and simplicity, we will assume from this point on that the call is initiated from station set 102, for example, and is destined for telephone set 103.

According to another aspect of the principles disclosed herein, when communications switch 108 receives (via POTS line 11) the calling and called party numbers associated with the call, communications switch 108, in step 601, queries database 112 to retrieve from the feature subscription table of FIG. 3 all pre-subscribed features associated with telephone set 102. This is done in order to ascertain the type of facilities (POTS, ISDN or Broadband CATV) associated with the subscriber line and to assess whether the service fee field should be suppressed in the record displayed to the caller. Thereafter, switch 108, in step 602 forwards the list of pre-subscribed features, if any, to adjunct processor 105 which proceeds, in step 603 to use that list to create a pre-call completion record, such as the one illustrated in FIG. 9.

Figure 9:
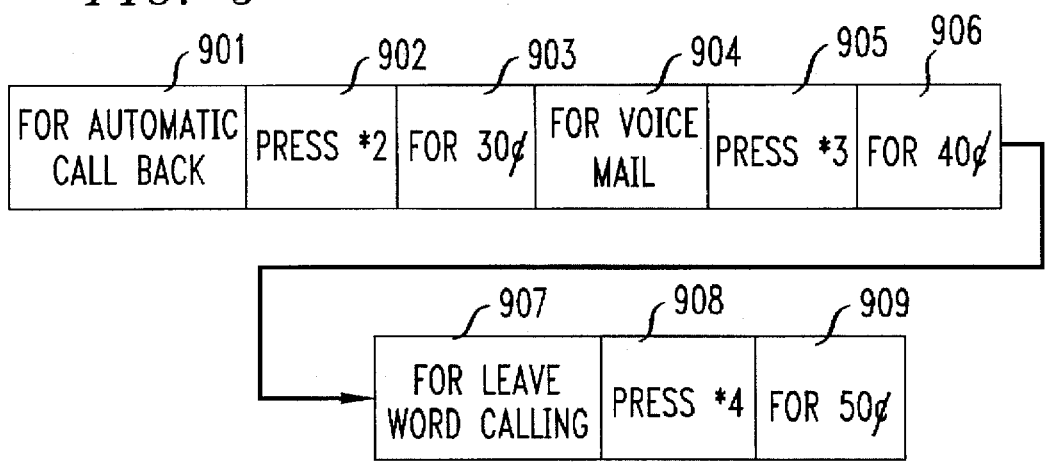

The pre-call completion record of FIG. 9 includes information associated with features that may be invokable by the caller based on the terminating supervisory signals or call progress tones (busy, ring-no-answer) received from the called party's telephone set. Three illustrative features are shown in some of the fields included in the pre-completion record of FIG. 9. Field 902 shows an illustrative activation code to be entered by a caller to invoke for a fee (indicated in field 903) the automatic callback feature ( shown in field 901) when the called party line is busy. As is well known in the art, the automatic callback feature allows a subscriber who is faced with a busy signal at a called party line, to be alerted via a distinctive ringing pattern when the busy station goes on-hook. Field 905 includes an illustrative activation code that is dialed in order for a caller to leave a voice mail message (field 904) for a called party when a busy tone or ring-no-answer signal is received at the called party's telephone set. Field 906 indicates the service fee for the recording and delivery of the message. Fields 908 and 909 show illustrative activation code and service fee, respectively, for the leave-word calling feature indicated in field 907. The leave word calling feature allows a caller to leave for an unavailable called party a brief message that is delivered in synthesized speech and that is indicative of the calling party number, time and date of the call.

Figure 10:
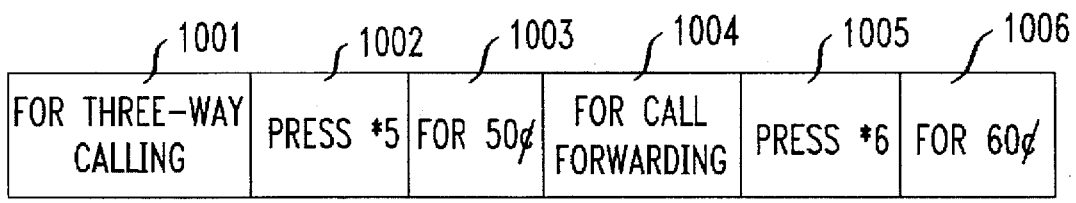

The pre-call completion record created by adjunct processor 109 is transferred to switch 108 which forwards it, in step 604, to end-user device 102 for display on the screen of display unit 22. Thereafter, switch 107 proceeds in step 605 to complete the call to end-user device 103. If the call is answered, as determined in step 606, adjunct processor 110 upon receiving an appropriate signal from switch 108, generates in step 607, the call completion record that is illustrated in FIG. 10. Field 1002 shows the illustrative activation code *5 that is used to invoke for a service fee of 60 cents (field 3) the 3-way calling feature (field 1001). Similarly, field 1005 indicates the activation code *6 that may be used by a caller to invoke the call forwarding feature (field 1004) at a cost of 60 cents (field 1006). The call completion record created by adjunct processor 110 is then transmitted to switch 108 which proceeds to forward that record to end-user device 22 which displays the record for the duration of the call. It is worth noting that customized records could be generated for display to a caller for each specific situation, such as a ring-no-answer condition, a busy line condition, to name a few.

Figure 7:
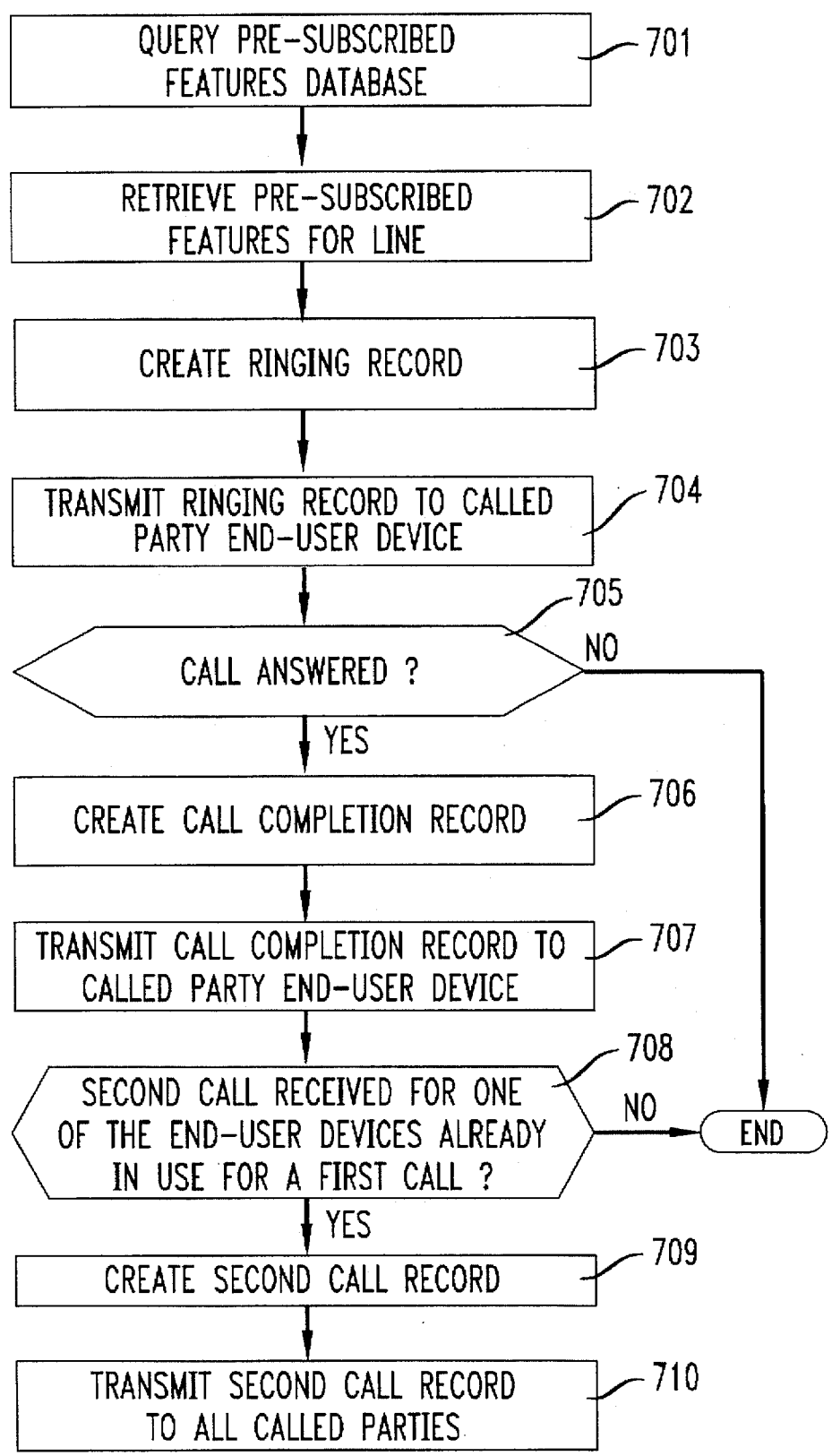

FIG. 7 shows instructions executed by some components of FIG. 1 to deliver service feature information to a called party. When switch 107 receives via signaling network 160 the calling and called party numbers from switch 108, switch 107, in step 701 uses the called party number to query database 111. This is done in order to retrieve pre-subscribed features for telephone set 103, and to ascertain the type of facilities (POTS, ISDN or Broadband CATV) associated with the subscriber line, as indicated in step 702. Thereafter, switch 107 sends a signaling message to adjunct processor 109 to indicate that line 103 is an ISDN BRI facility. The signaling message also indicates the types of pre-subscribed features for the called party number. Adjunct processor 109, in step 703, uses the pre-subscribed features to create a ringing record for the called party. The ringing record may include activation codes and service fees for features such as call forwarding, call muting and call tracing. The ringing record may be displayed to the called party, for example, between application of ringing tones to end-user device 103.

If the call is answered by the called party, as determined in step 705, adjunct processor 109 upon receiving an appropriate signal from switch 107, creates, in step 706, the call completion record illustrated in FIG. 10 for transmission to telephone set 103, as indicated in step 707.

Figure 11:
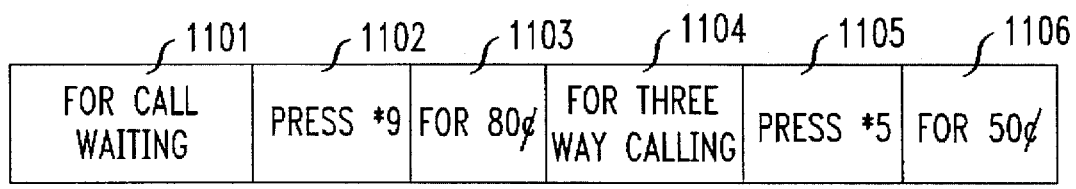

According to another aspect of the principles disclosed herein, when switch 107 (108) receives another call destined for telephone set 103 (102), as determined in step 708, the secondary call record illustrated in FIG. 11 is created by adjunct processor I 10 (109), in step 709 for transmission to telephone set 103 (102), as indicated in step 710. Shown in FIG. 1 1 is a record which includes features that are invokable by the second called party during the call. The record of FIG. 11 shows an illustrative activation code field 1102 which is dialed by the second called party for a fee that is shown in field 1103 in order to invoke the call waiting feature shown in field 1101. As is known in the art, call waiting allows a called party to be informed via distinctive tone that another call is waiting. Upon receiving the activation code 1102, switch 107 connects the second called party to the second caller. Similarly, activation code *5 shown in field 1105 allows the second called party to invoke the 3-way calling feature of field 1104 for the fee indicated in field 1106. Upon receiving *5, switch 107 (108) bridges all parties in a single call.

The foregoing is to be construed as only being an illustrative embodiment of the principles disclosed herein. Persons skilled in the art can easily conceive of alternative arrangements providing functionality similar to this embodiment without any deviation from the fundamental principles disclosed herein. For example, although the different records displayed to the subscribers include only English words, it is to be understood that the records could be created in a foreign language or in multiple languages, such as English and Spanish, to name a few. An activation code could be included in a record that allows a subscriber to select the language in which he or she wants the record to be displayed.

What is claimed is:

1. A method carried out by a provider for delivering communications services feature information comprising the steps of:
   recognizing that a call is being established between a party and a subscriber;
   retrieving database information related to a communications services feature that is invokable during said call from a database based on the identity of said subscriber or said party;
   transmitting communications services feature information to said party based on said database information and the current state of said call.

2. The method of claim 1 wherein said communications services feature information is transmitted after the call is established.

3. The method of claim 1 wherein said communications services feature information includes instructions on how to invoke said communications services feature.

4. The method of claim 3 further comprising the step of:
   receiving from said party a request for a communications service and delivering said service.

5. The method of claim 3 further comprising the step of:
   receiving from said party a request to effectuate said communications service and delivering said service feature.

6. The method of claim 1 wherein said communications services feature information includes a usage fee associated with invocation of said communications services feature.

7. The method of claim 1 wherein said database information includes the language in which said communications services feature information should be transmitted.

8. The method of claim 1 wherein said communications services feature information includes data represented in a format selected from a group which includes text and pictures.

9. The method of claim 1 wherein said communications services feature information includes data represented as animated pictures.

10. The method of claim 1 further comprising the steps of:
transmitting to said subscriber a message related to one or more communications services features that are invokable during said call.

11. The method of claim 1 wherein said communications services feature information includes data related to features pre-subscribed by the party or the subscriber.

12. The method of claim 1 wherein said communications services feature information is related to more than one communications services feature and wherein said features are selected from a group of features which include call waiting, call forwarding, three-way calling, voice messaging and speed dialing.

13. The method of claim 1 wherein said communications services feature information is related to more than one communications services feature grouped into one or more records, with each record including an activation code for invoking a feature for a fee and wherein a different record is transmitted to said party at different stages of the call.

14. The method of claim 13 wherein a record comprising activation codes for services which include voice mail, automatic callback and leave word calling is transmitted to said party during call setup time.

15. The method of claim 13 wherein a record comprising activation codes for services which include three-way calling and call forwarding is transmitted to said party when said call is answered.

16. The method of claim 13 further comprising the steps of:
receiving another call that is destined for said party; and
transmitting to said party a record comprising activation codes for services which include call waiting and three-way calling and call forwarding.

17. The method of claim 1 wherein said call is a multimedia call and wherein the communications service feature belongs to a set comprising picture substitution and picture muting.

18. A method carried out by a provider for delivering communications services information comprising the steps of:
establishing a call between a subscriber and a party;
retrieving database information related to a communications service that is non-subscribed by said subscriber and that is invokable during said call from a database based on the identity of said subscriber;
transmitting communications service information to said subscriber based on said database information and the current state of said call; and
in response to receiving a signal from said subscriber invoking said communications service during said call, delivering said service to said subscriber.

19. The method of claim 18 wherein said communications service is selected from a group which includes call waiting, call forwarding, three-way calling, voice messaging, leave word calling and automatic callback.

20. The method of claim 18 wherein communications service information associated with more than one communications service is transmitted to said subscriber and wherein said communications services are grouped into one or more records, with each record including an activation code for invoking a particular communications service for a fee and wherein a different record is transmitted to said subscriber at different stages of the call.

21. The method of claim 18 wherein information associated with more than one communications service is transmitted to said subscriber and wherein said information associated with more than one communications service is transmitted in decreasing order of commercial acceptance.

* * * * *